United States Patent [19]

Thomas

[11] Patent Number: 4,780,158

[45] Date of Patent: Oct. 25, 1988

[54] NOVEL METHOD FOR HEATING CYLINDRICAL ARTICLES AND APPARATUS USEFUL THEREFOR

[75] Inventor: Samuel J. Thomas, Lowell, Mass.

[73] Assignee: The Kendall Company, Boston, Mass.

[21] Appl. No.: 51,807

[22] Filed: May 18, 1987

[51] Int. Cl.⁴ .............................................. B32B 31/26
[52] U.S. Cl. ........................................ 156/82; 156/86; 156/304.2; 156/392; 156/497; 156/499
[58] Field of Search ................ 156/82, 86, 304.2, 497, 156/544, 545, 392, 499; 431/127, 168, 172, 175, 177, 354

[56] References Cited

U.S. PATENT DOCUMENTS

| | | | |
|---|---|---|---|
| 2,429,340 | 10/1947 | Bailey | 156/86 |
| 2,648,097 | 8/1953 | Kritchever | 156/82 |
| 4,268,333 | 5/1981 | Schwarz | 156/82 |
| 4,322,262 | 3/1982 | Cottam | 156/497 |

FOREIGN PATENT DOCUMENTS

| | | | |
|---|---|---|---|
| 765790 | 1/1957 | United Kingdom | 156/392 |
| 1027047 | 4/1966 | United Kingdom | 156/392 |

Primary Examiner—Caleb Weston
Attorney, Agent, or Firm—Alvin Isaacs

[57] ABSTRACT

Method for heating a heat-shrinkable pipewrap wherein the heat for shrinking is applied simultaneously throughout the periphery of the pipewrap surface; and novel apparatus useful therefor.

8 Claims, 2 Drawing Sheets

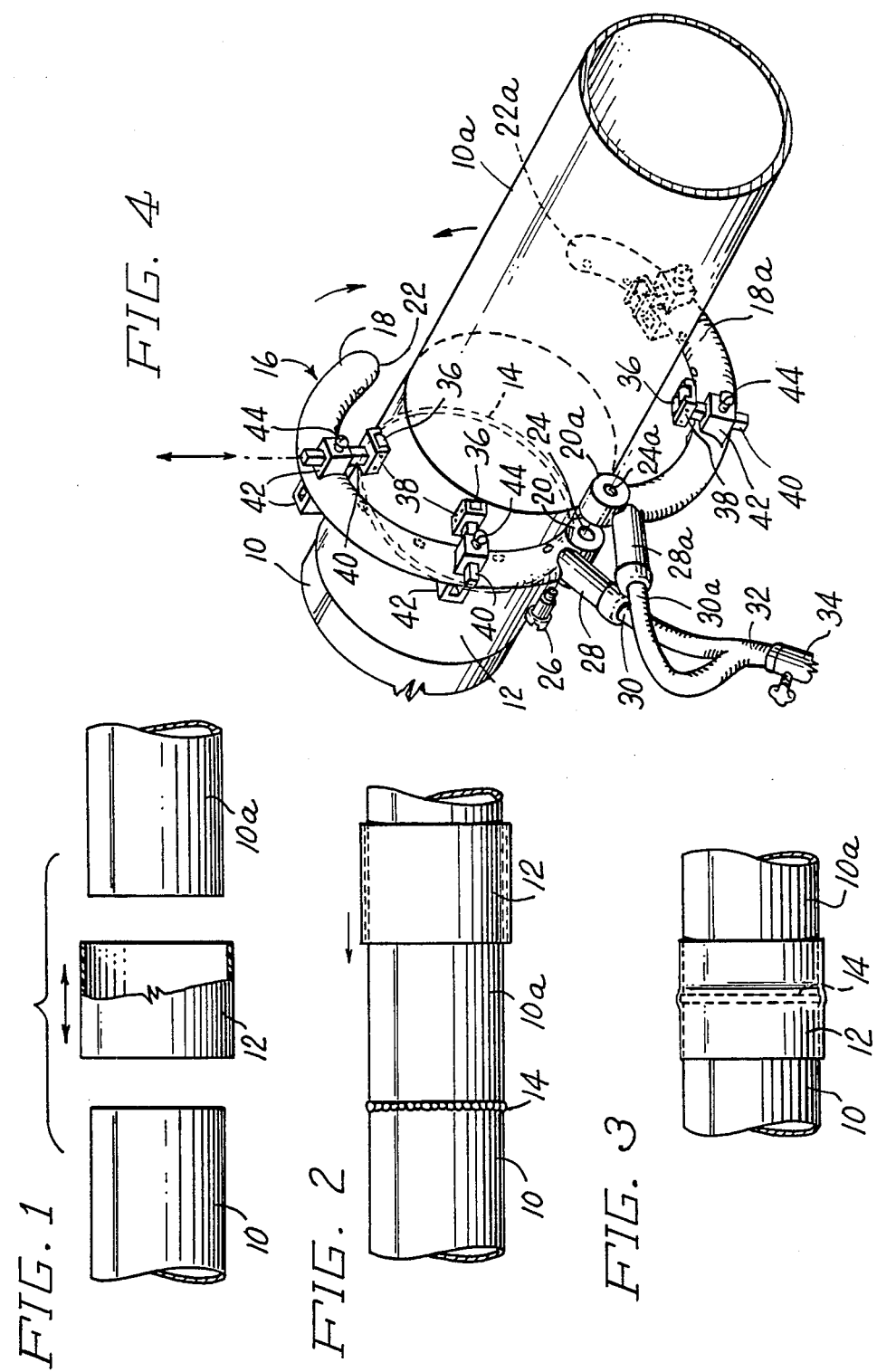

NOVEL METHOD FOR HEATING CYLINDRICAL ARTICLES AND APPARATUS USEFUL THEREFOR

BACKGROUND OF THE INVENTION

In the art of laying pipeline, whether for above ground or inground installation, individual pipe sections must first be joined, e.g. by welding. Thereafter, it is common practice to apply a protective wrap over the seam where the pipes are joined. The protective wrap may be in the form of a tube or sleeve which is slipped over the seam or it may be in the form of a sheet material or tape which is wound over the joint and secured in place. In either case, the inner surface of the wrap may contain an adhesive layer to enhance maintaining the protective wrap in place, as well as adherence to any irregularities in the pipe surface.

It is well known in the art to employ so-called heat-shrinkable or heat-recoverable materials for these protective wraps. While the patent literature is replete with references to heat-shrinkable materials for this purpose, the following patents selected from cursory search may be taken as illustrative.

U.S. Pat. No. 3,847,721 issued to Evans discloses articles for protecting tubular conduits which are heat recoverable in involute fashion to an overlapping, generally cylindrical configuration.

U.S. Pat. No. 4,517,234 issued to Fisher relates to flat lengths of heat recoverable material with integral latching means so that the material may be wrapped around a cable, pipe or similar structure, latched together and then shrunk down onto the structure by heating.

U.S. Pat. No. 4,521,470 issued to Overbergh discloses a dimensionally heat recoverable article useful for protection of service lines such as oil pipes and district heating pipes against corrosion, which articles carry a thermoplastic polymeric material and a heat-softenable adhesive of smaller thickness and lower softening or melting point than the polymeric material.

A particularly efficacious heat-shrinkable pipewrap material is described and claimed in the copending application of Anthony J. Doheny, Ser. No. 003,091 filed Jan. 14, 1987, and assigned to the Kendall Company, assignee of the instant application. As described therein, a polyolefinic film is oriented by stretching in the machine direction and thereafter a surface of the oriented film is irradiated with a low energy electron beam to provide a controlled differential crosslinking throughout its thickness from the irradiated surface, the degree of crosslinking thus decreasing from the irradiated surface to where substantially no crosslinking occurs at the opposed surface. Preferably, an adhesive layer, e.g. a rubber-based adhesive, is applied to the non-irradiated surface at some stage in the manufacturing process to provide a heat shrinkable adhesive tape which may then be spirally wound over the pipe joint.

Irrespective of whether the heat shrinkable protective pipewrap is initially in the form of a sleeve, a sheet of flat material or an adhesive tape, it is positioned over the pipe joint, typically extending on the order of one foot or more on either side of the seam, and then heat is applied circumferentially around the surface to effect shrinking so that the wrap is tightly adhered to prevent corrosion or other degradative environmental forces.

Typically, this is done by the pipeliner with a torch. In order to heat the underside, i.e. what may be described as the 4–8 o'clock portion of the circumference, it is necessary for him to be on the ground and/or under the pipe.

Apart from the time, effort and inconvenience for this method of application, heat applied sequentially in this manner is frequently inconsistent and non-uniform.

Stated simply, the task of the present invention is to obviate these disadvantages and to provide a method for easily and efficiently providing the consistent heat required for uniform shrinking of the protective wrap around the pipe circumference.

BRIEF DESCRIPTION OF THE INVENTION

In accordance with the present invention this task is solved in an elegant manner by providing an articulatable circumferential heater adapted for applying a uniform heat throughout the circumference of the pipewrap, the heater being movable along the length of the pipe.

BRIEF DESCRIPTION OF THE DRAWINGS

FIG. 1 is an exploded side view showing two pipe sections to be joined along with a shrink sleeve to be positioned over the seam;

FIG. 2 is a side view showing the joined pipe sections with the sleeve positioned for placement over the seam;

FIG. 3 is a similar view illustrating the sleeve in place over the seam;

FIG. 4 is a perspective view illustrating the novel circumferential heater of this invention and the manner of its placement over a shrinkable pipewrap.

DETAILED DESCRIPTION OF THE INVENTION

Figure 5:
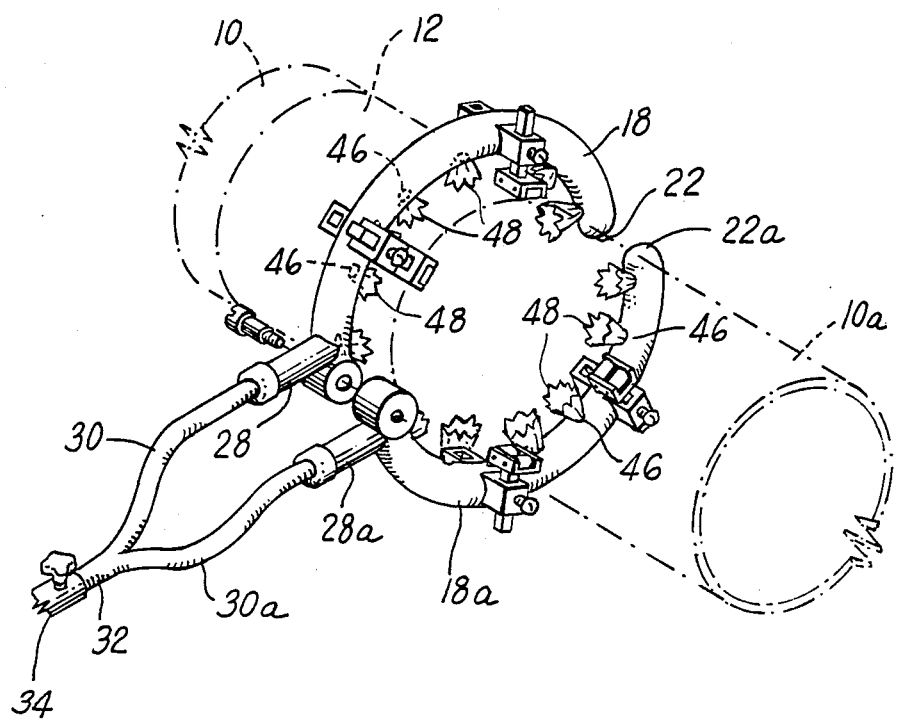
FIG. 5 is a perspective view illustrating the manner of applying heat circumferentially with the novel heater.

As previously mentioned, heat shrinkable protective pipewraps such as those heretofore known in the art may be in the form of a tube or sleeve, a flat sheet material or an adhesive tape. Irrespective of their initial form, they will be positioned substantially evenly overlapping the pipe seam and then shrunk by application of heat so that it adheres tightly to the pipe. The shrinkable material may contain a layer of adhesive coating or, alternatively, an adhesive coating may be applied over the pipes and the shrinkable material then wrapped over the adhesive-coated section of the pipes.

In the embodiment illustrated in the drawings, a generally tubular sleeve is shown.

FIG. 1 illustrates two pipes 10, 10a to be joined and the joint then to be covered or encased by sleeve 12. With reference to FIG. 2, sleeve 12 is slipped over one end of pipe 10a and the pipe sections 10, 10a are then welded together, providing seam 14. Sleeve 12 is then positioned over the seam, as shown in FIG. 3 and is now ready to be heat shrunk.

FIGS. 4 and 5 illustrate the manner for applying the heat to shrink sleeve 12, utilizing the novel circumferential heater of this invention.

As shown, heater 16 has two substantially equal arcuate tubular flammable fuel conduit sections 18, 18a, each of which is approximately half the circumference of circle. Fuel conduit sections 18, 18a have hinged ends 20, 20a and opposed (distal) closed ends 22, 22a, respectively. Hinged ends 20, 20a are provided with central coaxial holes 24, 24a respectively through which pivotable axial pin 26 is positioned, so that ends 20, 20a are pivotally engaged in order that opposed ends 22, 22a are free to swing from an open position to enable heater 16 to encircle a pipe (FIG. 4) to closed position where they are substantially in juxtaposition (FIG. 5).

Fuel conduit Sections 18, 18a are each provided with feed arms 28, 28a respectively adjacent their hinged ends for connection with a source of flammable fuel, e.g. propane gas. As shown, feed arms 28, 28a are connected to leading ends 30, 30a respectively of a bifurcated flexible fuel hose 32, the trailinq end of which (not shown) is connected to a flammable fuel source (also not shown). A shut-off valve 34 of per se known construction is provided to control fuel delivery to the heater.

In order to assure that the heater is equally spaced from the pipe throughout the pipe circumference, radially movable rollers 36 are provided at spaced intervals along the inner surface of sections 18, 18a. These rollers serve the additional function of facilitating traversal of the heater along the pipe surface during the heating operation.

Rollers 36 are journaled into roller housings 38 provided with radial support shafts 40.

As seen in the drawings, a series of roller securement housings are secured to sections 18, 18a at spaced intervals and the radial support shafts 38 of the roller housings are movably inserted within holes in securement housings 42. Set screws 44 are provided which when tightened will, in known manner, frictionally engage shafts 40 to secure them in place, thereby permitting adjustment of the rollers and in turn proper uniform spacing of the arcuate sections from the pipe surface.

The ability to adjust the rollers so they rest on the pipe surface permits heater 16 to be employed with somewhat varying pipe diameters as well as for accommodating irregularities on the pipe surface such as may, for example, be caused by the particular pipewrap system employed. While a simple set screw has been shown for purposes of illustration, it will be appreciated that a winged screw or similar configuration may be employed for ease of gripping for manual adjustment of rollers.

As shown in FIG. 5, a series of orifices or gas jets 46 are uniformly spaced along the inner surface of the arcuate segments which when ignited by a spark, match or other per se known means will cause a series of heating flames 48 to be emitted uniformly throughout the circumference.

In operation, adjacent pipe sections are joined and a shrinkable protective wrap is positioned over the joint. As previously mentioned, the wrap will typically extend at least a foot on either side of the seam, thus providing a wrap to be shrunk on the order of two feet or more.

In the embodiment shown in FIGS. 1 to 3, the shrinkable wrap is in the form of a sleeve which is positioned over one of the pipe sections before welding.

However, it will be appreciated that the present invention is equally useful with any of the other known shrinkable wraps. Thus for example, the wrap may comprise a sheet of material which is wrapped around the pipe and the ends then sealed or secured together to provide a sleeve, or it may be in the form of an elongated strip which is wrapped around the pipe, typically spirally wound, to form the protective overwrap.

In any case, the surface of the wrap contacting the pipe may and will preferably be provided with an adhesive coating for increased protection. Alternatively, if desired, an adhesive coating may first be applied to the pipe surface, followed by application of the shrinkable material. Most preferably, the adhesive employed is one, e.g. on a rubber-based adhesive which melts and flows when heated do as to provide intimate contact with, and thus adhesion to any irregularities on the pipe surface.

Following application of the shrink wrap, the circumferential heater is placed in position around the pipe, the rollers are adjusted to engage the pipe surface and the fuel is then ignited. The heater then traverses the wrap so as to effect the desired shrinkage.

As will be apparent, various modifications in the heater shown in the illustrative drawings may be made without departing from the scope of the invention herein contemplated. It is also contemplated, for example, that two or more arcuate circumferential heating units may be combined into a single unit to expedite heating. For instance, two or more of the heaters shown in the drawing, each with their own individual fuel hoses may be joined in spaced relationship, e.g. by spacer bars say, for example, 2 to 5 inches in length. In lieu thereof, they may be interconnected with spacers which are gas conduits so that the respective heating elements may operate from a single fuel hose.

Since certain changes may be made without departing from the scope of the invention herein involved, it is therefore intended that all matter described in the foregoing specification and drawings shall be interpreted as illustrative and not in a limiting sense.

What is claimed:

1. Apparatus for applying a substantially uniform heat to the surface of a substantially cylindrical article comprising:
   (1) A pair of substantially semicircular tubular flammable fuel conduits, each said conduit having a plurality of fuel jets spaced therealong and adapted for emitting a flammable fuel which when ignited will produce a flame for heating said article, said conduits being articulated together at one of their respective ends whereby the opposed ends of said conduits are movable from a spaced apart position for placement around the circumference of said cylindrical article to a closed position wherein said opposed ends are substantially in juxtaposition to encircle said cylindrical article with said fuel jets directed toward but substantially evenly spaced from the surface of said article;
   (2) means for introducing a flammable fuel into said conduits; and
   (3) adjustable spacer means engaging the surface of said cylindrical article to position each said fuel jet substantially equidistant from said surface.

2. Apparatus as defined in claim 1, wherein said spacer means comprises a plurality of rollers uniformly positioned along the inner surface of each said semicircular conduit.

3. Apparatus as defined in claim 1, wherein each said roller is journaled into roller housings having radial support shafts movably inserted into roller securement means fastened to said semicircular conduits said securement means having means for releasably engaging said shafts whereby to adjust and regulate the distance between each said roller engaging the surface of said article and said semicircular conduits.

4. Apparatus as defined in claim 1 including means for igniting said fuel jets.

5. A method for applying a heat-shrinkable film over a pipe joint comprising the steps of wrapping said film over said pipe joint; encircling said pipe padjacent one end of said film with a heating apparatus as defined in claim 1; igniting said apparatus; and traverseing the length of said film with said heater to shrink said film.

6. A method as defined in claim 5 wherein the surface of said film closest to said pipe surfave contains an adhesive coating.

7. A method as defined in claim 5 wherein said film is in the form of a sleeve.

8. A method as defined in claim 5 wherein said film comprises an adhesive tape wound around said pipe joint.

* * * * *